United States Patent
Peng et al.

(10) Patent No.: US 10,482,241 B2
(45) Date of Patent: Nov. 19, 2019

(54) VISUALIZATION OF DATA DISTRIBUTED IN MULTIPLE DIMENSIONS

(71) Applicant: SAP SE, Walldorf (DE)

(72) Inventors: Wei-Guo Peng, Dallau (DE); Eugen Pritzkau, Wiesloch (DE); Lin Luo, Wiesloch (DE); Hartwig Seifert, Elchesheim-Illingen (DE); Marco Rodeck, Maikammer (DE); Thomas Kunz, Lobbach/Lobenfeld (DE); Harish Mehta, Wiesenbach (DE); Florian Chrosziel, St. Leon-Rot (DE); Rita Merkel, Ilvesheim (DE); Jona Hassforther, Heidelberg (DE); Thorsten Menke, Bad Iburg (DE); Nan Zhang, Schriesheim (DE); Kathrin Nos, Nussloch (DE); Hristina Dinkova, Nussloch (DE)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 15/246,053

(22) Filed: Aug. 24, 2016

(65) Prior Publication Data
US 2018/0059876 A1 Mar. 1, 2018

(51) Int. Cl.
*G06F 3/048* (2013.01)
*G06F 21/55* (2013.01)

(52) U.S. Cl.
CPC .................. *G06F 21/552* (2013.01)

(58) Field of Classification Search
None
See application file for complete search history.

(56) References Cited

U.S. PATENT DOCUMENTS

| | | | |
|---|---|---|---|
| 5,440,726 A | 8/1995 | Fuchs | |
| 5,960,170 A | 9/1999 | Chen | |
| 6,173,418 B1 | 1/2001 | Fujino et al. | |
| 6,629,106 B1 | 9/2003 | Narayanaswamy | |
| 6,779,001 B1 | 8/2004 | Kanai et al. | |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |

(Continued)

OTHER PUBLICATIONS

Office Action in related U.S. Appl. No. 15/216,201 dated Mar. 7, 2018; 14 pages.
Office Action in related U.S. Appl. No. 15/274,569 dated Apr. 16, 2018; 11 pages.
U.S. Office Action in related U.S. Appl. No. 15/274,569 dated Nov. 14, 2018, 11 pages.
U.S. Office Action in related U.S. Appl. No. 15/380,450 dated Jan. 23, 2019, 21 pages.

(Continued)

*Primary Examiner* — Hua Lu
(74) *Attorney, Agent, or Firm* — Fish & Richardson P.C.

(57) ABSTRACT

A path associated with a set of selected log data is defined. An indication is received on a graphical user interface (GUI) to generate a bubblegram associated with the path, wherein the bubblegram comprises one or more bubbles, each bubble representing a particular dimension associated with the selected path. The one or more bubbles are rendered on the GUI according to a performed ranking of the one or more bubbles. A bubble is selected to generate a filter for the path based on the dimension associated with the bubble. A subsequent bubblegram is rendered based on a narrowed set of the selected log data.

18 Claims, 7 Drawing Sheets

(56) References Cited

U.S. PATENT DOCUMENTS

| | | |
|---|---|---|
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 * | 3/2015 | Pearcy ............... H04L 41/0893 726/25 |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 * | 10/2017 | Sherman ............... G06F 16/248 |
| 9,779,150 B1 * | 10/2017 | Sherman ............... G06F 16/26 |
| 9,843,596 B1 | 12/2017 | Avelbuch |
| 9,979,741 B2 | 5/2018 | Fuhrman |
| 1,000,138 A1 | 6/2018 | Das et al. |
| 1,010,237 A1 | 10/2018 | Seifert et al. |
| 10,140,447 B2 | 11/2018 | Rahaman et al. |
| 2002/0070953 A1 * | 6/2002 | Barg ............... G06Q 10/10 715/700 |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 * | 1/2004 | Zinda ............... G06F 16/30 |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0106847 A1 * | 5/2006 | Eckardt, III ........ G06F 16/3323 |
| 2006/0161816 A1 | 7/2006 | Gula et al. |
| 2006/0218140 A1 * | 9/2006 | Whitney ............... G06F 16/338 |
| 2006/0253907 A1 | 11/2006 | McConnell |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 * | 7/2008 | Subbu ............... G06F 9/451 715/763 |
| 2008/0288889 A1 * | 11/2008 | Hunt ............... G06Q 30/02 715/810 |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0096812 A1 * | 4/2009 | Boixel ............... G06Q 10/00 345/646 |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 * | 4/2011 | Hoffman ............ A63B 24/0062 702/5 |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 * | 10/2012 | DiSalvo ............... G06Q 40/04 705/37 |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 * | 5/2013 | de Loera ............... G06T 11/206 345/419 |
| 2013/0198840 A1 | 8/2013 | Drissi et al. |
| 2013/0212709 A1 * | 8/2013 | Tucker ............... G06F 21/55 726/29 |
| 2013/0262311 A1 | 10/2013 | Buhrmann |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 * | 3/2015 | Garman ............... G06Q 10/02 705/7.31 |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278214 A1 * | 10/2015 | Anand ............... G06F 16/338 707/748 |
| 2015/0278371 A1 * | 10/2015 | Anand ............... G06F 16/24578 707/723 |
| 2015/0281278 A1 | 10/2015 | Gooding |
| 2015/0310070 A1 * | 10/2015 | Stefik ............... G06F 16/24573 707/740 |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |

(56) References Cited

U.S. PATENT DOCUMENTS

| | | |
|---|---|---|
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1* | 12/2016 | Parker ............... G06Q 30/0205 |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1* | 3/2017 | Bell ....................... H04L 43/16 |
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

U.S. Office Action in related U.S. Appl. No. 15/383,771 dated Jan. 23, 2019, 14 pages.
Final Office Action issued in U.S. Appl. No. 15/274,693 dated Feb. 11, 2019, 19 pages.
Final Office Action issued in U.S. Appl. No. 15/370,084 dated Feb. 4, 2019, 16 pages.
Non-Final Office Action issued in U.S. Appl. No. 15/274,569 dated Mar. 22, 2019, 11 pages.
U.S. Office Action in related U.S. Appl. No. 15/274,693 dated Jul. 26, 2018, 14 pages.
U.S. Office Action in related U.S. Appl. No. 15/216,201 dated Jul. 20, 2018, 15 pages.
U.S. Office Action in related U.S. Appl. No. 15/253,438 dated Sep. 19, 2018, 17 pages.
U.S. Office Action in related U.S. Appl. No. 15/370,084 dated Aug. 27, 2018, 14 pages.
U.S. Office Action in related U.S. Appl. No. 15/380,450 dated Aug. 27, 2018, 19 pages.
U.S. Office Action in related U.S. Appl. No. 15/380,450 dated Nov. 2, 2018, 19 pages.
U.S. Office Action in related U.S. Appl. No. 15/380,379 dated Jul. 19, 2018, 9 pages.
U.S. Office Action in related U.S. Appl. No. 15/381,567 dated Nov. 2, 2018, 17 pages.
U.S. Office Action in related U.S. Appl. No. 15/383,771 dated Aug. 3, 2018, 12 pages.
Schumacher, "An effective way to brin SAP Security Notes under control," Virtual Forge GmbH, Feb. 2017, https://blog.virtualforge.com/en/an-effective-way-to-bring-sap-security-notes-under-control, 4 pages.
Non-Final Office Action issued in U.S. Appl. No. 15/639,863 dated Jun. 24, 2019, 37 pages.
U.S. Office Action in related U.S. Appl. No. 15/383,771 dated Jul. 5, 2019, 16 pages.
Office Action issued in U.S. Appl. No. 15/847,478, dated Aug. 6, 2019, 36 pages.
Non-Final Office Action issued in U.S. Appl. No. 15/216,046 dated Apr. 29, 2019, 23 pages.
Final Office Action issued in U.S. Appl. No. 15/381,567 dated May 22, 2019, 28 pages.

* cited by examiner

VISUALIZATION OF DATA DISTRIBUTED IN MULTIPLE DIMENSIONS

BACKGROUND

Enterprise threat detection (ETD) typically collects and stores a large amount/large sets of log data associated with various systems (often referred to as "big data") associated with an enterprise computing system. The stored data can be analyzed computationally using forensic-type data analysis tools to identify suspicious behavior in revealed patterns, trends, interactions, and associations, especially relating to ETD behavior. Appropriate responses can then be taken if malicious behavior is suspected or identified. Given the amount/size of the stored data and possible multiple attributes or dimensions the stored data can be distributed in, it can be difficult for a user to filter out unrelated data when searching for particular data. As a result, users can easily lose overview/perspective while viewing and analyzing data in a user interface.

SUMMARY

The present disclosure describes methods and systems, including computer-implemented methods, computer program products, and computer systems for visualizing data distributed in multiple dimensions.

In an implementation, a path associated with a set of selected log data is defined. An indication is received on a graphical user interface (GUI) to generate a bubblegram associated with the path, wherein the bubblegram comprises one or more bubbles, each bubble representing a particular dimension associated with the selected path. The one or more bubbles are rendered on the GUI according to a performed ranking of the one or more bubbles. A bubble is selected to generate a filter for the path based on the dimension associated with the bubble. A subsequent bubblegram is rendered based on a narrowed set of the selected log data.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described graphical user interface (GUI) and methodology allows the most important or relevant information/data to be placed into the middle of the GUI. Second, value distributions of a large amount of attributes (representing dimensions) can be reflected visually for easier understanding. Third, the described GUI and methodology can be implemented in various computer environments (for example, hardware, operating systems, GUI technologies, browsers, etc.). Fourth, the efficient presentation of attributes/dimensions permit the use of mobile devices and touch-type interfaces for visualizing data distributed in multiple dimensions. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
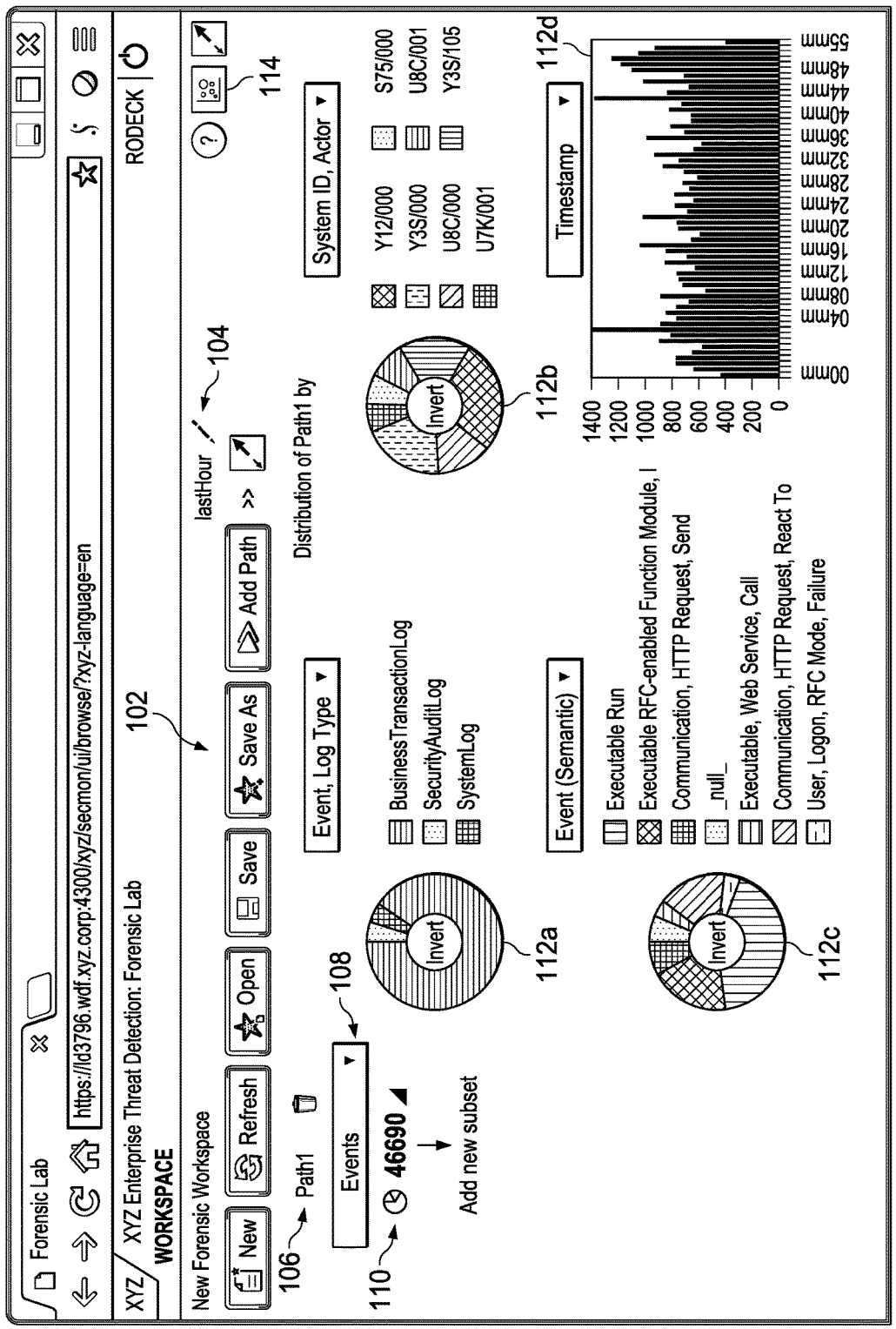
FIG. 1 is a screenshot of an example ETD forensic lab user interface, according to an implementation.

The following detailed description describes visualizing data distributed in multiple dimensions and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Enterprise threat detection (ETD) typically collects and stores a large amount/large sets of log data associated with various systems (often referred to as "big data") associated with an enterprise computing system. The stored data can be analyzed computationally using forensic-type data analysis tools to identify suspicious behavior in revealed patterns, trends, interactions, and associations, especially relating to ETD behavior. Appropriate responses can then be taken if malicious behavior is suspected or identified. Given the amount/size of the stored data and possible multiple attributes or dimensions the stored data can be distributed in, it can be difficult for a user to filter out unrelated data when searching for particular data. As a result, users can easily lose overview/perspective while viewing and analyzing data in a user interface.

Measure is a value on which some sort of mathematical function can be performed, for example revenue. Revenue can be measured by adding, subtracting, averaging, etc. A dimension provides context for a measure. For example, revenue per day, revenue per product, etc. An attribute is similar to a dimension, but a dimension can have multiple attributes. For example, for a date dimension, every date value has multiple attributes: a day of the year, week of the year, and day of the week for a particular date. Note that the illustrated bubblegrams below do not distinguish between attributes and dimensions (so they may be used interchangeably). Those of ordinary skill in the art will understand that attributes and dimensions can be distinguished in the example bubblegrams consistent with the techniques, user interface elements, etc. illustrated.

Current approaches in ETD for analyzing big data include analysis of documentation about available attributes or leveraging a user with required domain knowledge so that the user can guess approximately which dimension(s) that can/should be chosen in analysis based on data currently presented to the user. However, with currently available user interfaces, multi-dimensional distributions of attributes received in log data can hide attributes, the distribution, and even the dimensions themselves from a user; making ETD data analysis cumbersome and inefficient. Described in this disclosure is a proposed bubble diagram (hereinafter "bubblegram") used to address above-described shortcomings in current user interfaces and to provide greater overview/perspective to a user while analyzing ETD data.

FIG. 1 is a screenshot of an example ETD forensic lab user interface 100, according to an implementation. On the left side, user interface 100 permits the user to open a new forensic workspace 102 according to a particular timeframe 104 and for defined path 106 (here "Path 1"). For the purposes of this disclosure, a path contains a series of filters. Starting with a "complete" set of log data (a particular chosen data source) for analysis, after creating a path, a particular subset of log data under analysis should remain. The application of a new filter in a path results in a new subset, which is necessarily at least equal to or smaller than a previous set/subset. Multiple logs can be analyzed in a single path. Associated with the path 106, a selection 108 can be made of particular data type (currently "Events" is shown as the selection). Other example data types that can be selected include "Health Check" (network PING checks are regularly performed to determine if all connected systems are still available or "Alert" (alerts generated by ETD pattern execution). An overall count 110 of the number of available events is displayed. In typical implementations, the overall count 110 is also selectable (small arrow to the lower right of the count number). By clicking the small arrow, a pulldown will be shown that allows the creation of a pattern, creation of a chart, displaying raw data of the current subset, etc.

On the right side of user interface 100, user options to distribute various selectable dimensions of the set of log data. Each displayed chart is independent and provides a distributed view of the current subset of log data based on the selected path. For example, the charts (here, "Event, Log Type" 112a, "System ID, Actor" 112b, "Event (Semantic)" 112c, and "Timestamp" 112d). Here the four charts mean that the current subset with 46,690 log events can be distributed by "Event, Log Type," "System ID, Actor," "Event (Semantic)," and "Timestamp." In some implementations, initial distributions (the number depending on, for example, display size, data types available, etc.) can be preselected based on any relevant criteria consistent with this disclosure. The user can change the initial, pre-selections to view other distributions. Changing the path will automatically change the selected distributions to reflect the updated subset of data. In some implementations, the right side of UI 100 can be scrolled to permit addition of (using a user interface element—not illustrated) or visualization of other available distributions. In some implementations, the visualizations can be set to none to remove them from the display or removed (using a user interface element—not illustrated). Selecting button 114 initiates display of a bubblegram for the selected subset (which contains, for example, 46,690 log events.

Figure 2:
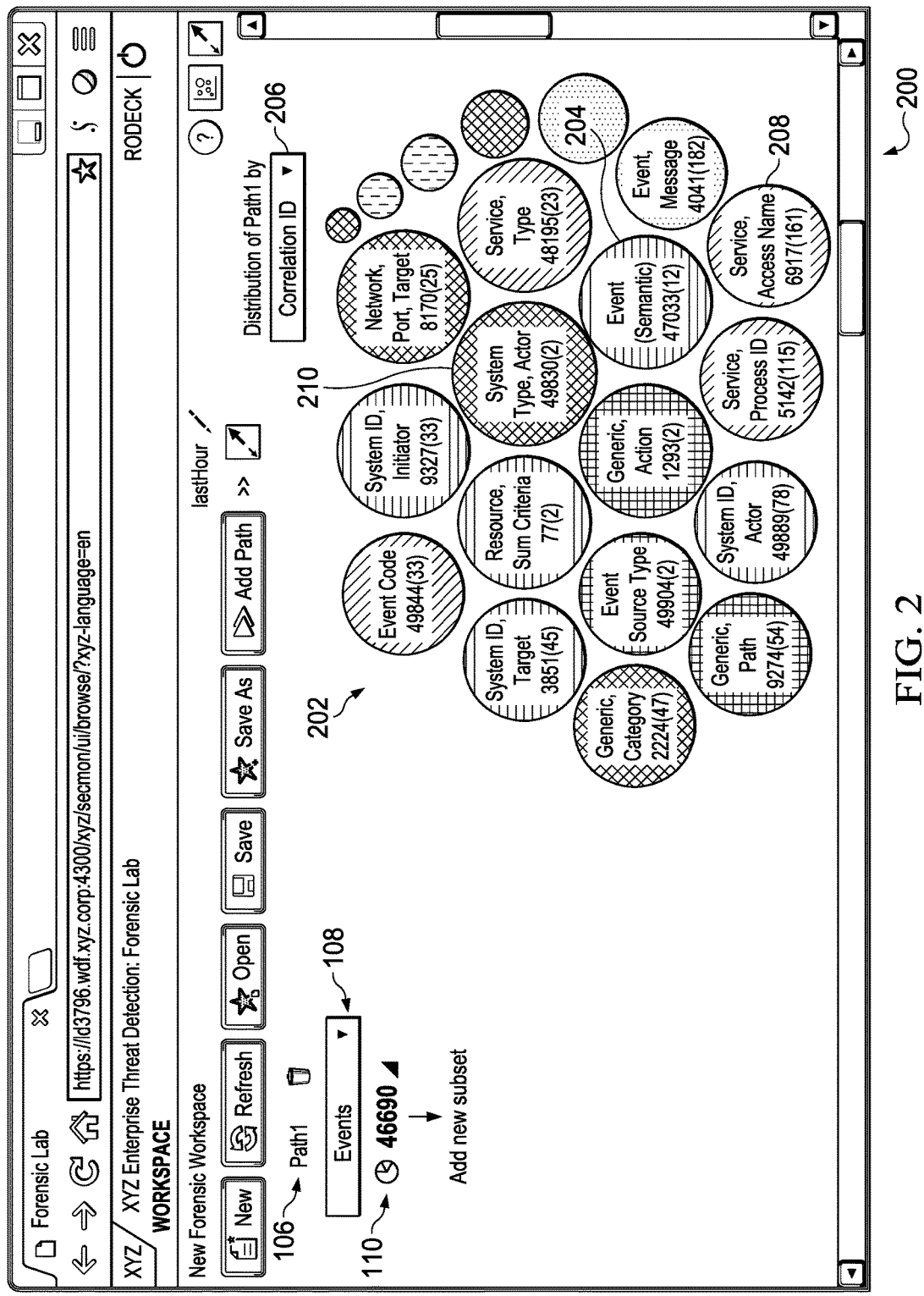
FIG. 2 is a screenshot of an example bubblegram, according to an implementation.

FIG. 2 is a screenshot 200 of an example bubblegram 202, according to an implementation. The bubblegram 202 presents many "bubbles" (for example, bubble 204) in a user interface. The distribution of the count 110 (46,690) of events 108 associated with the selected path 106 is illustrated to be by distribution value 206 (here "Correlation ID)." Here, "Correlation ID" is a dimension (similar to 112a-112d in FIG. 1). This initial bubblegram 202 displays the entire data distribution and count of events for events 108 selected in FIG. 1. Generally, all semantic attributes associated with the events selected (108) and that contain values are shown in the bubblegram 202. Some technical attributes, such as timestamp or timestamp of insertion (where the distribution of values is very high), can, in some implementations, be configured to not be displayed. With respect to the described events selected (108), a log event database table is often sparsely occupied (that is, many dimensions may not filled with values). As noted above, the bubblegram 202 only shows only dimensions that contain values to filter out non-applicable dimensions from review.

In typical implementations, each particular bubblegram is rendered on-the-fly and not stored. In other implementations, each particular bubblegram associated with a particular filter sequence can be stored for historical purposes. In particular, a sequence of filters can be stored (as well as opened, edited, deleted, etc.) in an ETD workspace to allow rapid application of a particular filter to return to a particular generated bubblegram.

Each bubble of the bubblegram 202 illustrates a particular count/distribution of dimensions/attributes in the currently selected subset/path 106, which are not zero (here events 108). For example, bubble 204 is directed to and displays the dimension "Event (Semantic) 47033(12)" meaning there is a count of 47033 Semantic Event values with 12 distinct values in the overall 47033 log event count (in this case, some of the 12 distinct values are repeated which results in only 12 distinct overall values).

Ranking of bubbles in the bubblegram 202 can be used as a measure of relevance (or relatedness) of the dimension/attribute associated with the particular bubble to the dimension/attribute represented by the overall bubblegram 202. Accordingly, smaller sized bubbles can be either ignored or considered less important unless the associated dimension/attribute is of particular known relevance.

In typical implementations, the size of each of the displayed bubbles is mapped to a ranking value of the distribution. The ranking can be calculated based on one or more properties of the data. In the illustrated implementation, the smaller the size of a particular bubble, the lower its overall relative ranking. For example, bubble 204 is larger than bubble 208 which contains "Service Access Name 6917 (161)." Calculation of the ranking is internal and relies on the number of distinct values in comparison to the count(*). As will appreciated by those of ordinary skill in the art, ranking can be performed on any applicable value(s) consistent with this disclosure and consistent with a particular need. The size of the displayed bubbles can be adjusted based on a number of bubbles displayed, available space in the user interface, and the calculated ranking. As an example of one possible way of ranking, in the illustrated example, "Event (Semantic) 47033(12)" is ranked higher as there are less distinct values than for "Service Access Name 6917 (161)."

In typical implementations, the bubbles are positioned according to their rankings, typically with the highest ranking bubbles in the middle of the bubblegram and the lowest ranking bubbles positioned outwardly from the middle toward the edges of the bubblegram as ranking decreases. Larger-sized bubbles are placed more toward the middle of the bubblegram and are more easily seen and considered to be of higher relevance to the associated dimension/attribute represented by the overall bubblegram 202. For example, bubble 204 is positioned closer to the center than bubble 208 based on their rankings. Bubble 210 would then be considered of higher rank than bubble 204 based on both its position and size.

Figure 3:
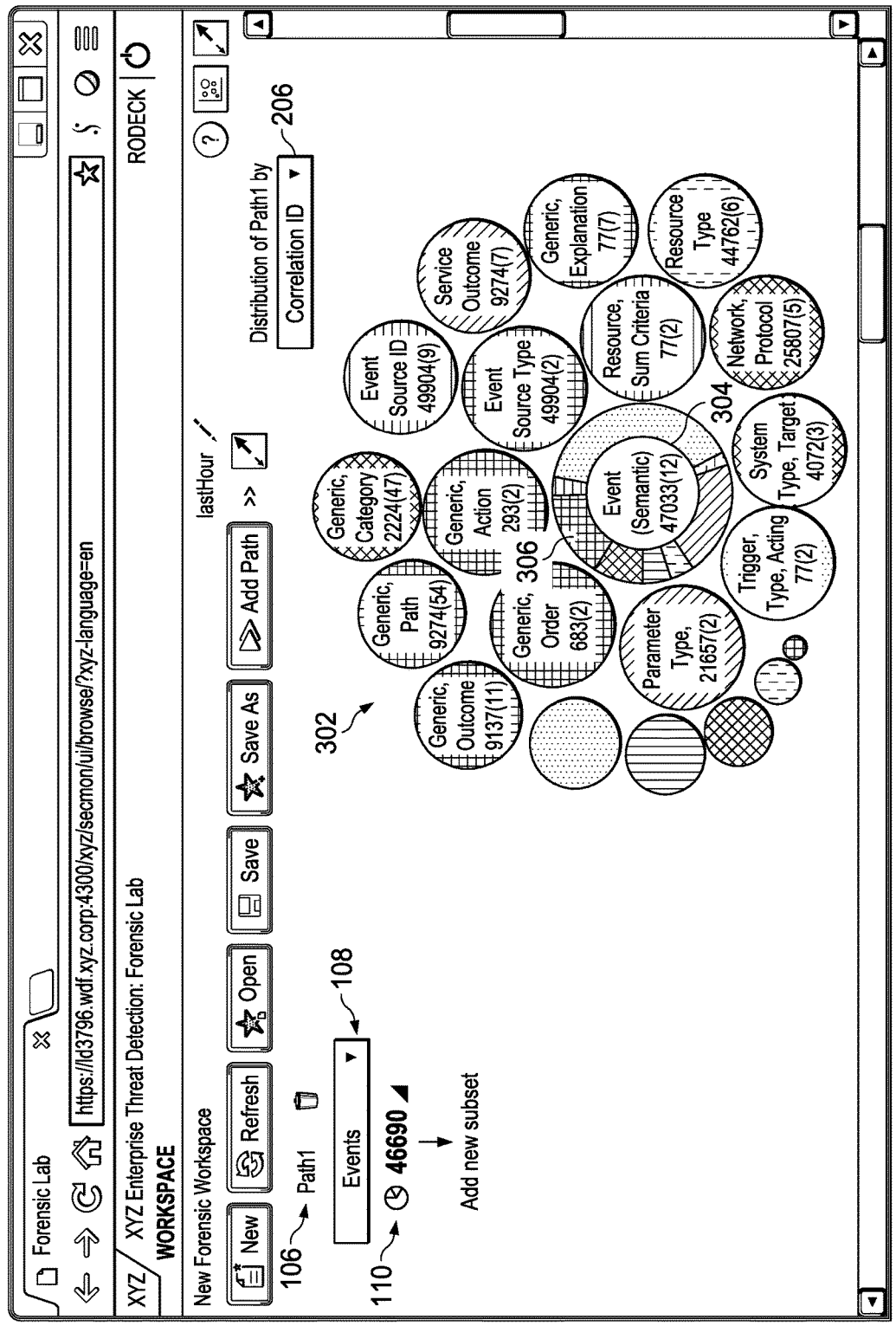
FIG. 3 illustrates a screenshot of an example updated bubblegram following a selection of a bubble representing a particular dimension in the bubblegram of FIG. 2, according to an implementation.

FIG. 3 illustrates a screenshot 300 of an example updated bubblegram 302 following a selection of a bubble representing a particular dimension in the bubblegram of FIG. 2, according to an implementation. For example, if bubble 204 ("Event (Semantic) 47033(12)") of FIG. 2 is selected, it is moved into the middle of bubblegram 202 and displayed as an enlarged bubble 304 enriched with attribute values. Here, the same bubbles associated with bubblegram 202 are repositioned typically only as much as necessary to remain consistent with bubblegram 202 to allow better focus of the larger bubble 204/304.

In the illustrated implementation, an inner distribution of attributes associated with the dimension represented by bubble 304 is displayed as a circular (donut-type) chart 306 surrounding centralized bubble 304. The circular chart 306 has various arcs that are selectable (for example with a "click" of a pointing device or a touch on a touch screen) using the user interface. A value is associated with each arc and is used as a further filter for a newly initiated filtered bubblegram if an arc is selected. For example, the attribute "Event Code" could have possible values such as "OBSERVED" and "DENIED". As another example, the attribute "Communication, HTTP Request, Allow" could have a possible value of "Communication, HTTP Request, Allow."

Although not illustrated in the figures, selecting the bubble 304 results in an inversion of attribute values illustrated around the bubble 304 in the the circular chart 306. In typical implementations, inversion is calculated according to, for example, f(x)=1/x or other inversion-type function(s). In effect, larger counts described above are then represented with smaller arcs and vice versa, in order to enable the selection on the UI of smaller counts that would otherwise be overshadowed or almost physically impossible to select on the UI (for example, the arc on the circular chart 306 may be too narrow to point and click with a mouse or using a touch UI). Note that inverted values are not illustrated in the figures.

Figure 4:
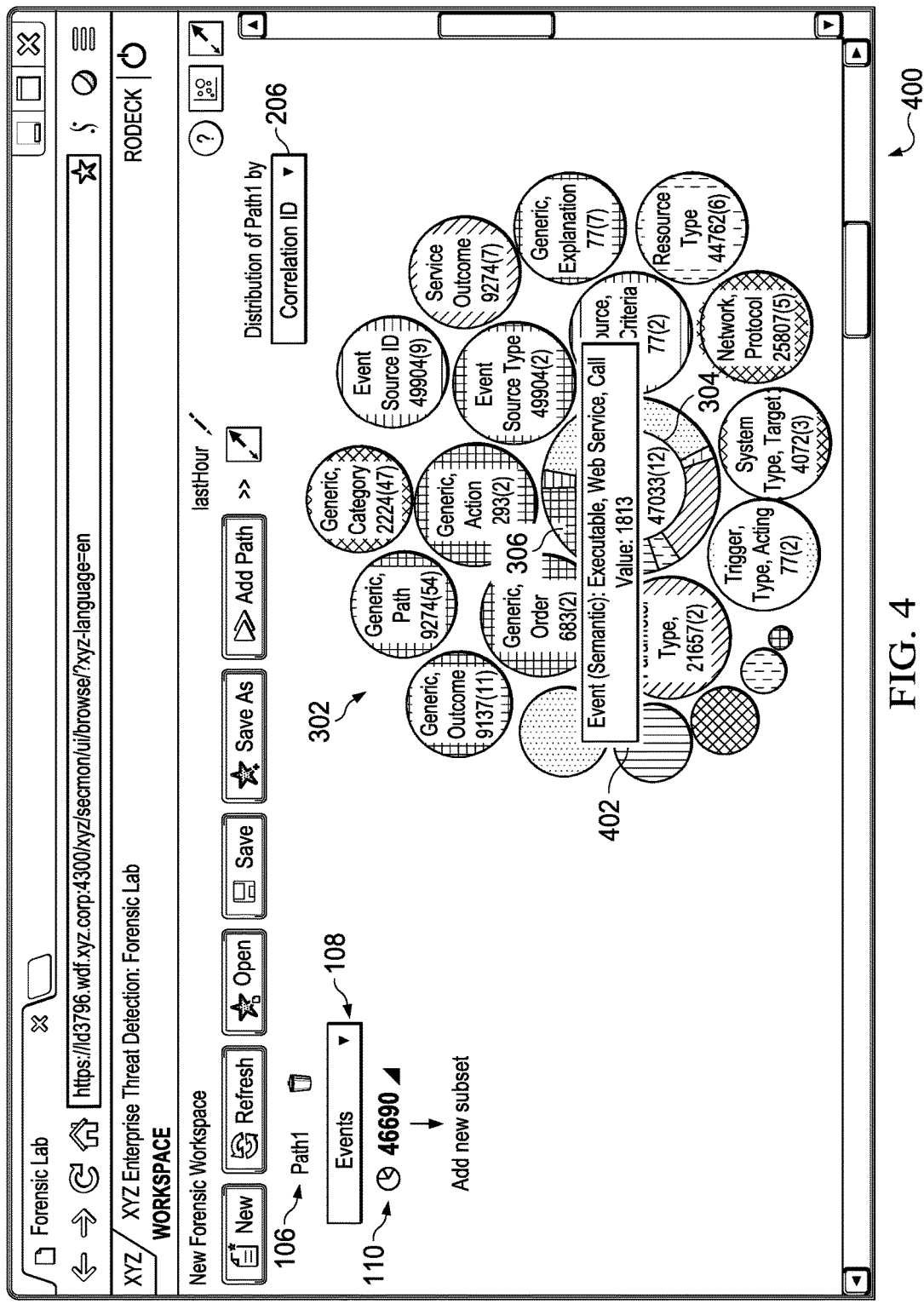
FIG. 4 is a screenshot of an informational dialog displayed over the bubblegram of FIG. 3 following detection of a mouseover-type event associated with a particular arc of the circular chart, according to an implementation.

FIG. 4 is a screenshot 400 of an informational dialog 402 displayed over the bubblegram 302 of FIG. 3 following detection of a mouseover-type event associated with a particular arc of the circular chart 306, according to an implementation. For example, FIG. 4 illustrates that a user has "hovered" over an arc associated with "Executable, Web Service, Call" with a value of "1813."

If an arc or informational dialog (for example, informational dialog 402) is selected using the UI, the existing bubblegram is then filtered according to the value associated with the arc/informational dialog and a newly initiated bubblegram is rendered and displayed.

Figure 5:
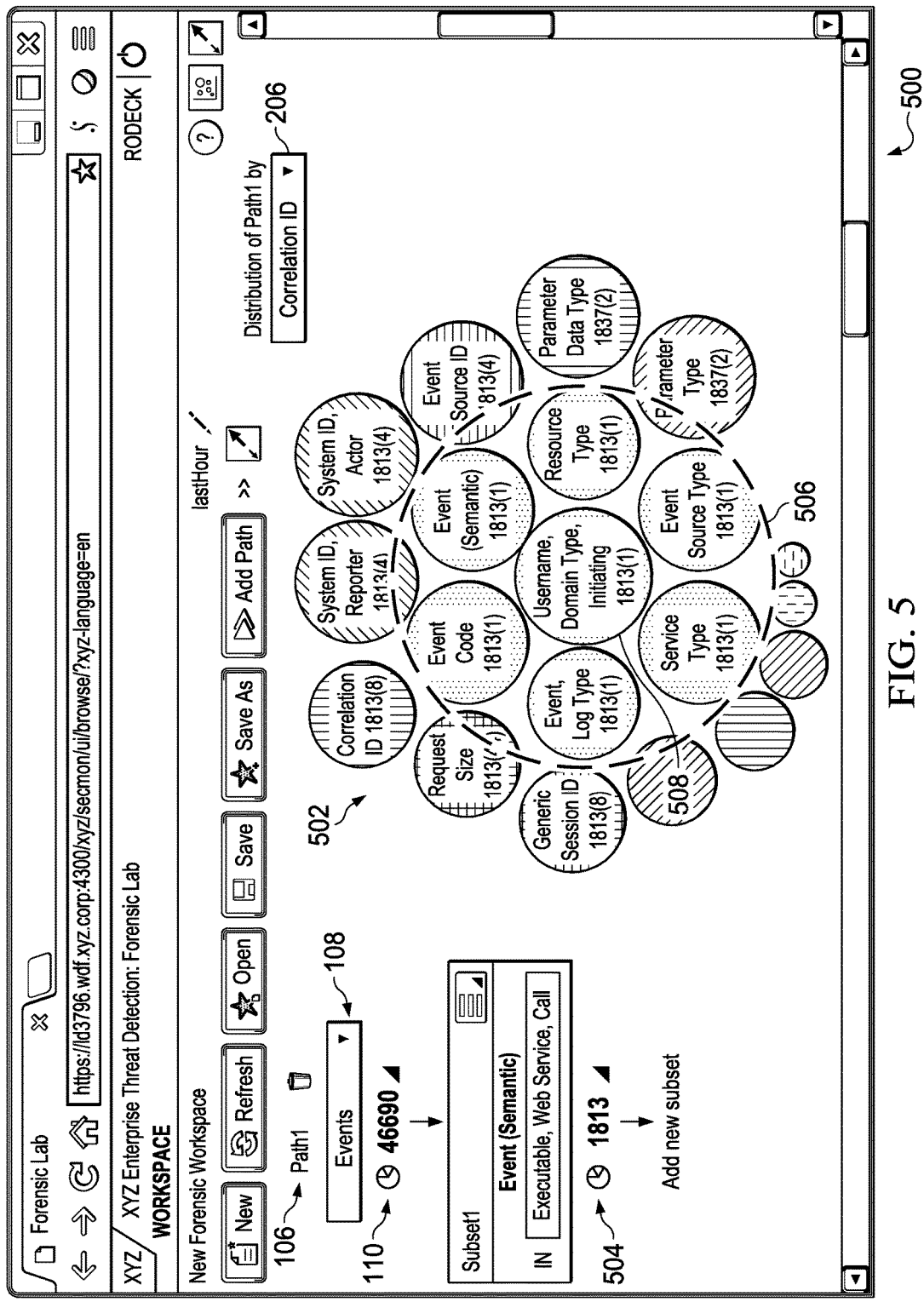
FIG. 5 is a screenshot of a newly initiated bubblegram following selection of an arc associated with the circular chart of FIG. 4, according to an implementation.

FIG. 5 is a screenshot 500 of a newly initiated bubblegram 502 following selection of an arc associated with the circular chart 306 of FIG. 4, according to an implementation. Bubblegram 502 represents a subset of events represented in bubblegram 400 of FIG. 4. For example, in FIG. 5, "Event (Semantic): Executable, Web Service, Call Value: 1813" was selected as a filter in FIG. 4. Note that bubblegram 502 illustrates a new distribution of a filtered subset (newly created with the filter 504 "Event (Semantic): Executable, Web Service, Call Value: 1813").

Note that the bubbles delimited by dashed circle 506 are dimensions with only one distinct event type value indicating there is only one value possibility and adding it to a filter will result in the same count (that is, no filtering effect/variability is zero). For example, bubble 508 has a count value of "Username, Domain Type, Initiating 1813(1)." As explained above, this means that there are 1813 events in the subset of type "Username, Domain Type, Initiating" with the same distinct value.

Figure 6:
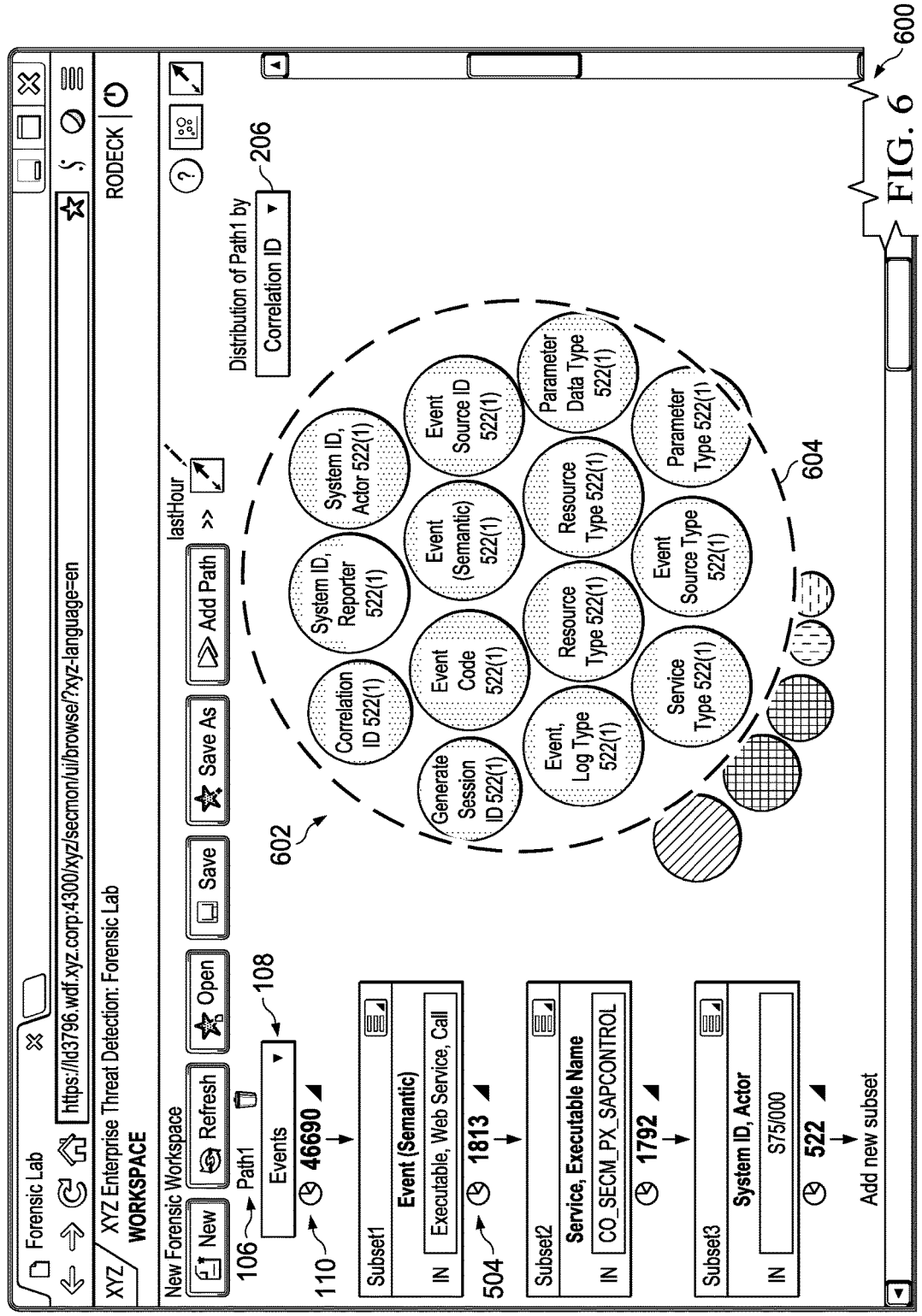
FIG. 6 is a screenshot of a newly initiated bubblegram following selections consistent with FIGS. 2-5, according to an implementation.

FIG. 6 is a screenshot 600 of a newly rendered bubblegram 602 following selections consistent with FIGS. 2-5, according to an implementation. Notice that path 106 is longer due to the addition of additional filters. Note that as selections are made consistent with FIGS. 2-5, the level of available log data with more than one distinct value for review is reduced due to the additionally added filters. Note the increased number of bubbles with a dimensions having only one distinct event type value as delimited by dashed circle 604. Here the filter is "Event (Semantic)," "Service, Executable Name," "System ID, Actor."

In some implementations, bubbles can be colored to further visualize dimensions and attributes or properties associated with dimensions and attributes. For example, all network attributes can have a blue bubble, all parameter attributes can be green, etc. As will be appreciated by those of ordinary skill in the art, colors can be chosen for any purpose or desires consistent with this disclosure. In some implementations, colors do not have to be consistent between different bubblegrams (for example, between bubblegrams 202 and 502).

Figure 7:
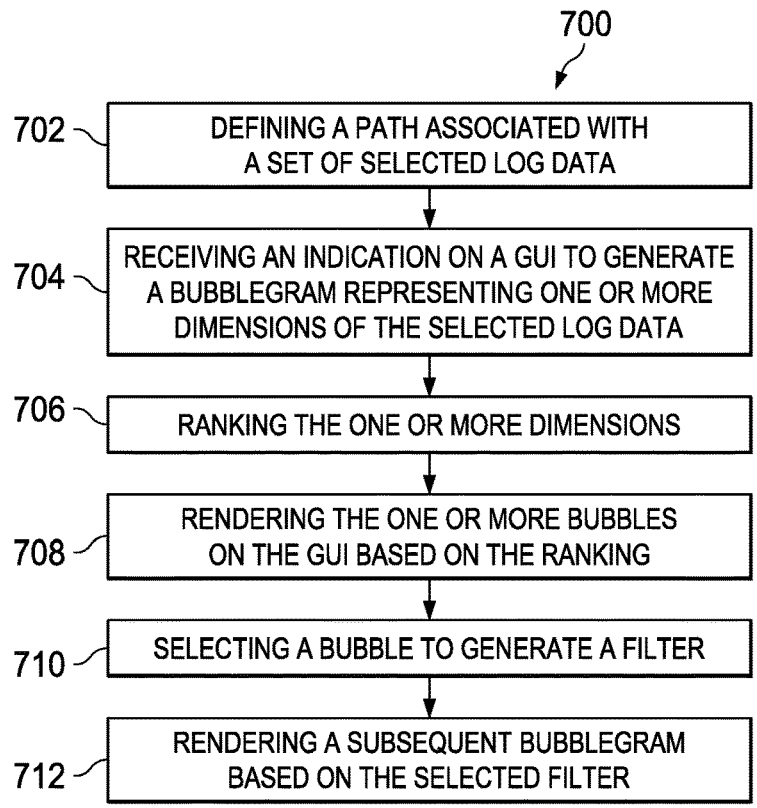
FIG. 7 is a flowchart of an example method for visualizing data distributed in multiple dimensions, according to an implementation.

FIG. 7 is a flowchart of an example method 700 for visualizing data distributed in multiple dimensions, according to an implementation. For clarity of presentation, the description that follows generally describes method 700 in the context of the other figures in this description. However, it will be understood that method 700 may be performed, for example, by any suitable system, environment, software, and hardware, or a combination of systems, environments, software, and hardware as appropriate. In some implementations, various steps of method 700 can be run in parallel, in combination, in loops, or in any order.

At 702, a path is defined that is associated with a set of selected log data. The path specifies one or more filters for the set of selected log data. From 702, method 700 proceeds to 704.

At 704, an indication is received on a graphical user interface (GUI) to generate a bubblegram associated with the path, wherein the bubblegram comprises one or more bubbles, each bubble representing a particular dimension associated with the selected path. Each bubble indicates a total count of event values associated with the particular dimension represented by the bubble and a count of distinct values within the total count. In some implementations, color can be used with a bubble to indicate attributes or properties associated with a particular dimension. From 704, method 700 proceeds to 706.

At 706, ranking the one or more dimensions. A size of a particular bubble in relation to other bubbles indicates a ranking of the particular bubble in relation to the other bubbles. A position of a particular bubble in relation to other bubbles indicates a ranking of the particular bubble in relation to the other bubbles. From 706, method 700 proceeds to 708.

At 708, the one or more bubbles are rendered on the GUI according to the ranking of the one or more dimensions. From 708, method 700 proceeds to 710.

At 710, a bubble is selected to generate a filter for the path based on the dimension associated with the bubble. Once selected, the selected bubble is positioned in the center of the bubblegram, the selected bubble is enlarged, and a set of arcs is rendered in a circular pattern surrounding the selected bubble, each arc representing a particular attribute associated with the dimension associated with the selected bubble. From 710, method 700 proceeds to 712.

At 712, a subsequent bubblegram is rendered based on a narrowed set of the selected log data. After 712, method 700 stops.

Figure 8:
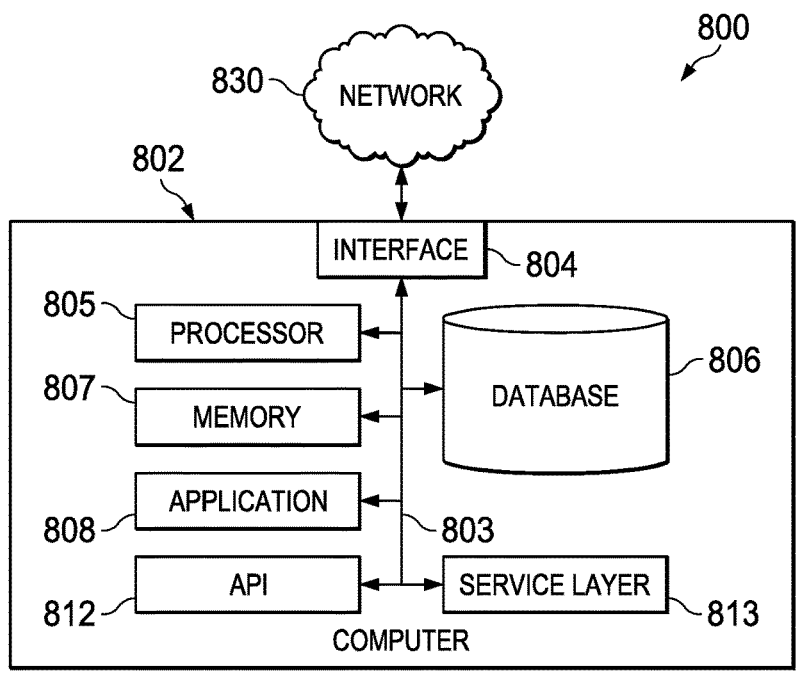
FIG. 8 is a block diagram of an exemplary computer system used to provide computational functionalities associated with described algorithms, methods, functions, processes, flows, and procedures as described in the instant disclosure, according to an implementation.

FIG. 8 is a block diagram of an exemplary computer system 800 used to provide computational functionalities associated with described algorithms, methods, functions, processes, flows, and procedures as described in the instant disclosure, according to an implementation. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 830 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment that are connected to the network 830 (whether illustrated or not). Generally, the interface 804 comprises logic encoded in software or hardware (or a combination of software and hardware) and operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). For example, memory 807 can be random access memory (RAM), read-only memory (ROM), optical, magnetic, and the like storing data consistent with this disclosure. In some implementations, memory 807 can be a combination of two or more different types of memory (for example, a combination of RAM and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, applications, etc. Further, although illustrated as a single application 808, the application 808 may be implemented as multiple applications 807 on the computer 802. In addition, although illustrated as integral to the computer 802, in alternative implementations, the application 808 can be external to the computer 802.

There may be any number of computers 802 associated with, or external to, a computer system containing computer 802, each computer 802 communicating over network 830. Further, the term "client," "user," and other appropriate terminology may be used interchangeably as appropriate without departing from the scope of this disclosure. Moreover, this disclosure contemplates that many users may use one computer 802, or that one user may use multiple computers 802.

Described implementations of the subject matter can include one or more features, alone or in combination.

For example, in a first implementation, a computer-implemented method, comprising: defining a path associated with a set of selected log data; receiving an indication on a graphical user interface (GUI) to generate a bubblegram associated with the path, wherein the bubblegram comprises one or more bubbles, each bubble representing a particular dimension associated with the selected path; rendering the one or more bubbles on the GUI according to a performed ranking of the one or more bubbles; selecting a bubble to generate a filter for the path based on the dimension associated with the bubble; and rendering a subsequent bubblegram based on a narrowed set of the selected log data.

The foregoing and other described implementations can each optionally include one or more of the following features:

A first feature, combinable with any of the following features, wherein the path specifies one or more filters.

A second feature, combinable with any of the previous or following features, wherein each bubble indicates a total count of event values associated with the particular dimension represented by the bubble and a count of distinct values within the total count.

A third feature, combinable with any of the previous or following features, wherein a size of a particular bubble in relation to other bubbles indicates a ranking of the particular bubble in relation to the other bubbles.

A fourth feature, combinable with any of the previous or following features, wherein a position of a particular bubble in relation to other bubbles indicates a ranking of the particular bubble in relation to the other bubbles.

A fifth feature, combinable with any of the previous or following features, wherein color is used with a bubble to indicate attributes or properties associated with a particular dimension.

A sixth feature, combinable with any of the previous or following features, comprising: positioning the selected bubble in the center of the bubblegram; enlarging the selected bubble; and rendering a set of arcs in a circular pattern surrounding the selected bubble, each arc representing a particular attribute associated with the dimension associated with the selected bubble.

In a second implementation, a non-transitory, computer-readable medium storing one or more instructions executable by a computer system to perform operations comprising: defining a path associated with a set of selected log data; receiving an indication on a graphical user interface (GUI) to generate a bubblegram associated with the path, wherein the bubblegram comprises one or more bubbles, each bubble representing a particular dimension associated with the selected path; rendering the one or more bubbles on the GUI according to a performed ranking of the one or more bubbles; selecting a bubble to generate a filter for the path based on the dimension associated with the bubble; and rendering a subsequent bubblegram based on a narrowed set of the selected log data.

The foregoing and other described implementations can each optionally include one or more of the following features:

A first feature, combinable with any of the following features, wherein the path specifies one or more filters.

A second feature, combinable with any of the previous or following features, wherein each bubble indicates a total count of event values associated with the particular dimension represented by the bubble and a count of distinct values within the total count.

A third feature, combinable with any of the previous or following features, wherein a size of a particular bubble in relation to other bubbles indicates a ranking of the particular bubble in relation to the other bubbles.

A fourth feature, combinable with any of the previous or following features, wherein a position of a particular bubble in relation to other bubbles indicates a ranking of the particular bubble in relation to the other bubbles.

A fifth feature, combinable with any of the previous or following features, wherein color is used with a bubble to indicate attributes or properties associated with a particular dimension.

A sixth feature, combinable with any of the previous or following features, comprising one or more instructions to:

position the selected bubble in the center of the bubblegram; enlarge the selected bubble; and render a set of arcs in a circular pattern surrounding the selected bubble, each arc representing a particular attribute associated with the dimension associated with the selected bubble.

In a third implementation, a computer-implemented system, comprising: a computer memory; and a hardware processor interoperably coupled with the computer memory and configured to perform operations comprising: defining a path associated with a set of selected log data; receiving an indication on a graphical user interface (GUI) to generate a bubblegram associated with the path, wherein the bubblegram comprises one or more bubbles, each bubble representing a particular dimension associated with the selected path; rendering the one or more bubbles on the GUI according to a performed ranking of the one or more bubbles; selecting a bubble to generate a filter for the path based on the dimension associated with the bubble; and rendering a subsequent bubblegram based on a narrowed set of the selected log data.

The foregoing and other described implementations can each optionally include one or more of the following features:

A first feature, combinable with any of the following features, wherein the path specifies one or more filters.

A second feature, combinable with any of the previous or following features, wherein each bubble indicates a total count of event values associated with the particular dimension represented by the bubble and a count of distinct values within the total count.

A third feature, combinable with any of the previous or following features, wherein a size of a particular bubble in relation to other bubbles indicates a ranking of the particular bubble in relation to the other bubbles.

A fourth feature, combinable with any of the previous or following features, wherein a position of a particular bubble in relation to other bubbles indicates a ranking of the particular bubble in relation to the other bubbles.

A fifth feature, combinable with any of the previous or following features, wherein color is used with a bubble to indicate attributes or properties associated with a particular dimension.

A sixth feature, combinable with any of the previous or following features, configured to: position the selected bubble in the center of the bubblegram; enlarge the selected bubble; and render a set of arcs in a circular pattern surrounding the selected bubble, each arc representing a particular attribute associated with the dimension associated with the selected bubble.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    defining a filter path associated with a set of selected log data, wherein the filter path is user-selected and specifies a series of one or more filters used to generate a particular subset of the log data associated with the filter path;
    receiving an indication on a graphical user interface (GUI) to generate a bubblegram associated with the filter path, wherein the bubblegram comprises one or more bubbles, each bubble representing a particular dimension associated with the filter path, and the one or more bubbles are distributed using a distribution value;
    rendering the one or more bubbles on the GUI according to a performed ranking of the one or more bubbles, wherein higher ranking bubbles are displayed closer to a middle of the bubblegram than lower ranking bubbles;
    receiving a user input comprising a selection of a bubble indicating a filter to be added to the filter path based on a dimension of the bubble, the filter defining a narrowed set of the selected log data; and
    rendering a subsequent bubblegram based on the narrowed set of the selected log data.

2. The computer-implemented method of claim 1, wherein each bubble indicates a total count of event values associated with the particular dimension represented by the bubble and a count of distinct values within the total count.

3. The computer-implemented method of claim 1, wherein a size of a particular bubble in relation to other bubbles indicates a ranking of the particular bubble in relation to the other bubbles, the size being adjustable based on a total number of the one or more bubbles within the bubblegram.

4. The computer-implemented method of claim 1, wherein a position of a particular bubble in relation to other bubbles indicates a ranking of the particular bubble in relation to the other bubbles.

5. The computer-implemented method of claim 1, wherein color is used with a bubble to indicate attributes or properties associated with a particular dimension.

6. The computer-implemented method of claim 1, comprising:
    positioning the selected bubble in the center of the bubblegram;
    enlarging the selected bubble; and
    rendering a set of arcs in a circular pattern surrounding the selected bubble, each arc representing a particular attribute associated with the dimension associated with the selected bubble.

7. The computer-implemented method of claim 1, further comprising:
    processing the narrowed set of the selected log data using forensic-type data analysis tools.

8. A non-transitory, computer-readable medium storing one or more instructions executable by a computer system to perform operations comprising:
    defining a filter path associated with a set of selected log data, wherein the filter path is user-selected and specifies a series of one or more filters used to generate a particular subset of the log data associated with the filter path;
    receiving an indication on a graphical user interface (GUI) to generate a bubblegram associated with the filter path, wherein the bubblegram comprises one or more bubbles, each bubble representing a particular dimension associated with the filter path, and the one or more bubbles are distributed using a distribution value;
    rendering the one or more bubbles on the GUI according to a performed ranking of the one or more bubbles, wherein higher ranking bubbles are displayed closer to a middle of the bubblegram than lower ranking bubbles;

receiving a user input comprising a selection of a bubble indicating a filter to be added to the filter path based on a dimension of the bubble, the filter defining a narrowed set of the selected log data; and rendering a subsequent bubblegram based on the narrowed set of the selected log data.

9. The non-transitory, computer-readable medium of claim 8, wherein each bubble indicates a total count of event values associated with the particular dimension represented by the bubble and a count of distinct values within the total count.

10. The non-transitory, computer-readable medium of claim 8, wherein a size of a particular bubble in relation to other bubbles indicates a ranking of the particular bubble in relation to the other bubbles.

11. The non-transitory, computer-readable medium of claim 8, wherein a position of a particular bubble in relation to other bubbles indicates a ranking of the particular bubble in relation to the other bubbles, the size being adjustable based on a total number of the one or more bubbles within the bubblegram.

12. The non-transitory, computer-readable medium of claim 8, wherein color is used with a bubble to indicate attributes or properties associated with a particular dimension.

13. The non-transitory, computer-readable medium of claim 8, comprising one or more instructions to:

position the selected bubble in the center of the bubblegram;

enlarge the selected bubble; and render a set of arcs in a circular pattern surrounding the selected bubble, each arc representing a particular attribute associated with the dimension associated with the selected bubble.

14. A computer-implemented system, comprising:

a computer memory; and a hardware processor interoperably coupled with the computer memory and configured to perform operations comprising:

defining a filter path associated with a set of selected log data, wherein the filter path is user-selected and specifies a series of one or more filters used to generate a particular subset of the log data associated with the filter path;

receiving an indication on a graphical user interface (GUI) to generate a bubblegram associated with the filter path, wherein the bubblegram comprises one or more bubbles, each bubble representing a particular dimension associated with the filter path, and the one or more bubbles are distributed using a distribution value;

rendering the one or more bubbles on the GUI according to a performed ranking of the one or more bubbles, wherein higher ranking bubbles are displayed closer to a middle of the bubblegram than lower ranking bubbles;

receiving a user input comprising a selection of a bubble indicating a filter to be added to the filter path based on a dimension of the bubble, the filter defining a narrowed set of the selected log data; and rendering a subsequent bubblegram based on the narrowed set of the selected log data.

15. The computer-implemented system of claim 14, wherein each bubble indicates a total count of event values associated with the particular dimension represented by the bubble and a count of distinct values within the total count.

16. The computer-implemented system of claim 14, wherein a size of a particular bubble and a position of a particular bubble in relation to other bubbles indicates a ranking of the particular bubble in relation to the other bubbles, the size being adjustable based on a total number of the one or more bubbles within the bubblegram.

17. The computer-implemented system of claim 14, wherein color is used with a bubble to indicate attributes or properties associated with a particular dimension.

18. The computer-implemented system of claim 14, configured to:

position the selected bubble in the center of the bubblegram;

enlarge the selected bubble; and render a set of arcs in a circular pattern surrounding the selected bubble, each arc representing a particular attribute associated with the dimension associated with the selected bubble.

\* \* \* \* \*